Figure 3:
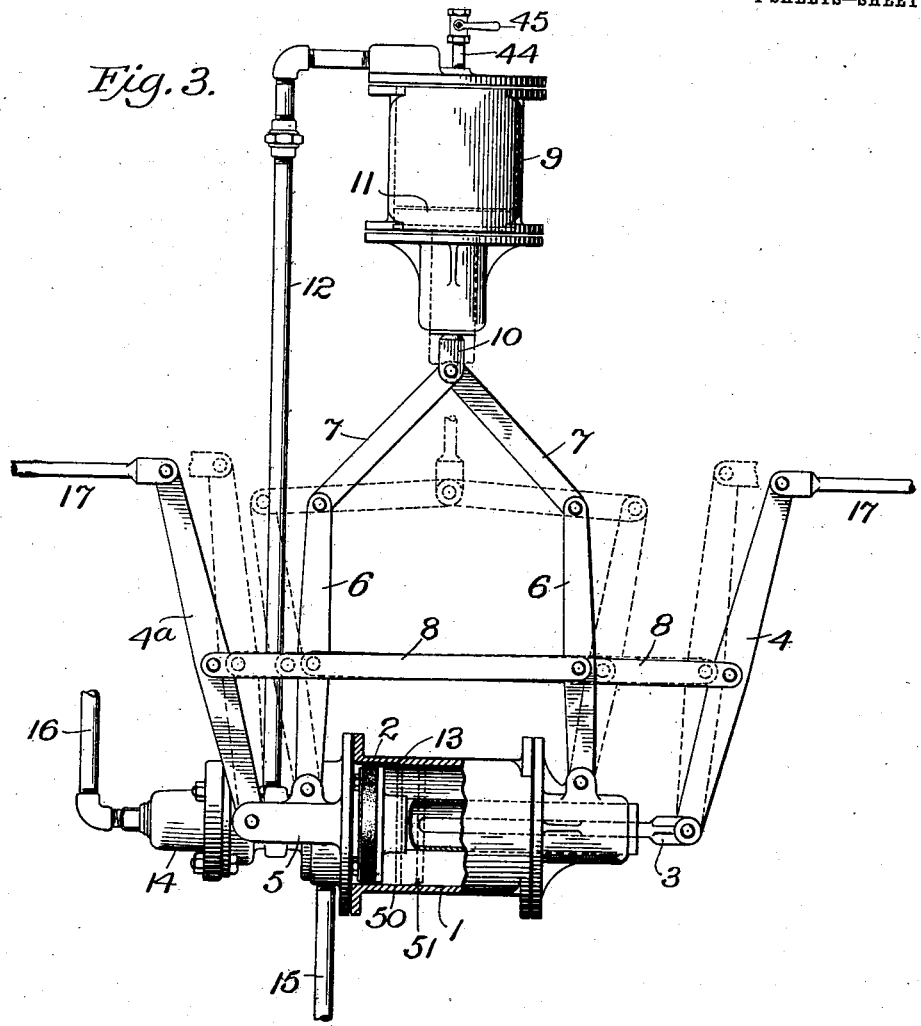

No. 756,065. PATENTED MAR. 29, 1904.
E. G. SHORTT.
COMPOUND AIR BRAKE MECHANISM.
APPLICATION FILED JULY 1, 1902.
NO MODEL. 4 SHEETS—SHEET 1.
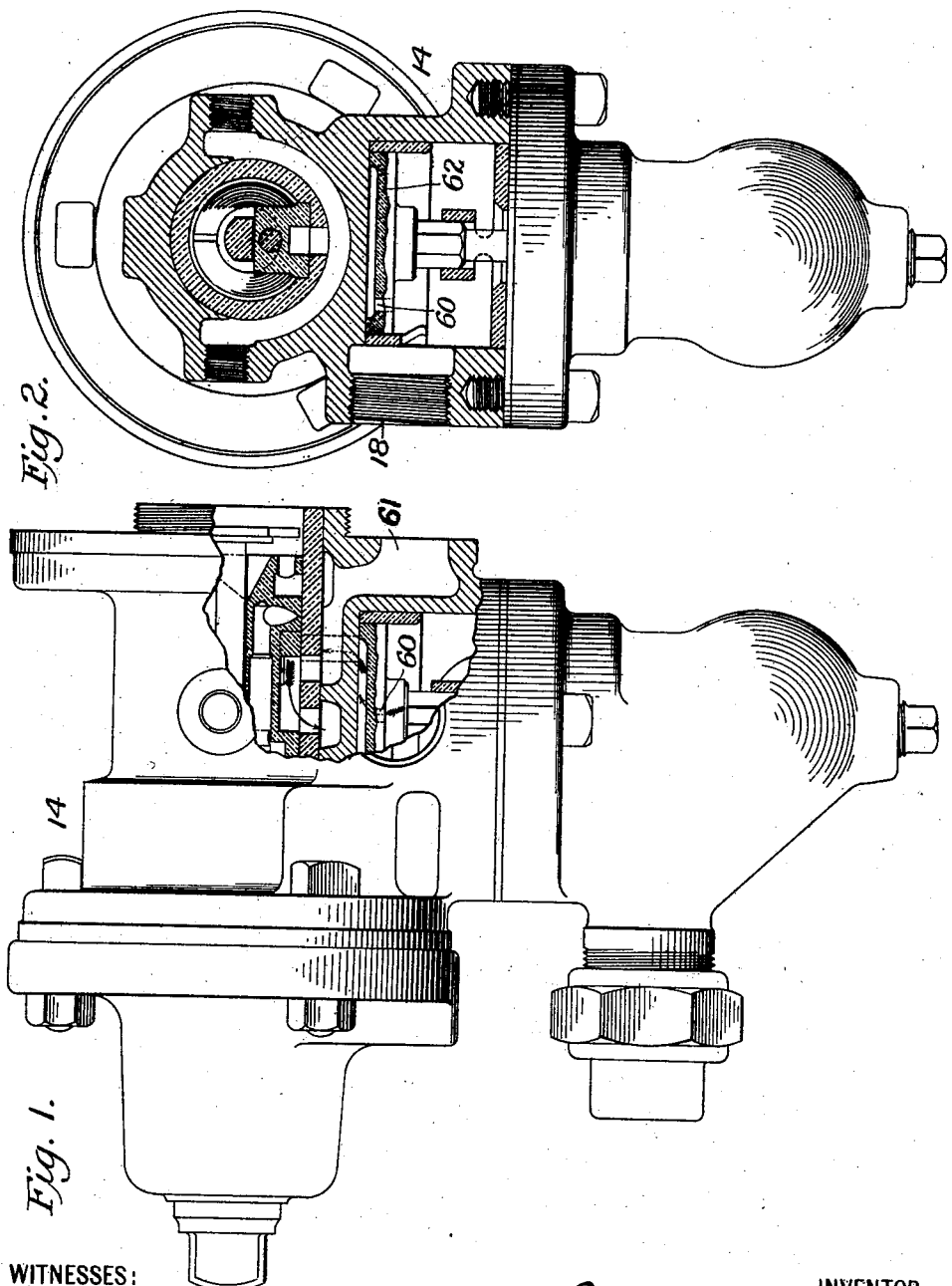

No. 756,065. PATENTED MAR. 29, 1904.
E. G. SHORTT.
COMPOUND AIR BRAKE MECHANISM.
APPLICATION FILED JULY 1, 1902.
NO MODEL. 4 SHEETS—SHEET 2.

WITNESSES: James P. Duhamel, M. L. Shay.

INVENTOR Edward G. Shortt, BY Fred E. Tasker, ATTORNEY

No. 756,065. PATENTED MAR. 29, 1904.
E. G. SHORTT.
COMPOUND AIR BRAKE MECHANISM.
APPLICATION FILED JULY 1, 1902.
NO MODEL. 4 SHEETS—SHEET 3.
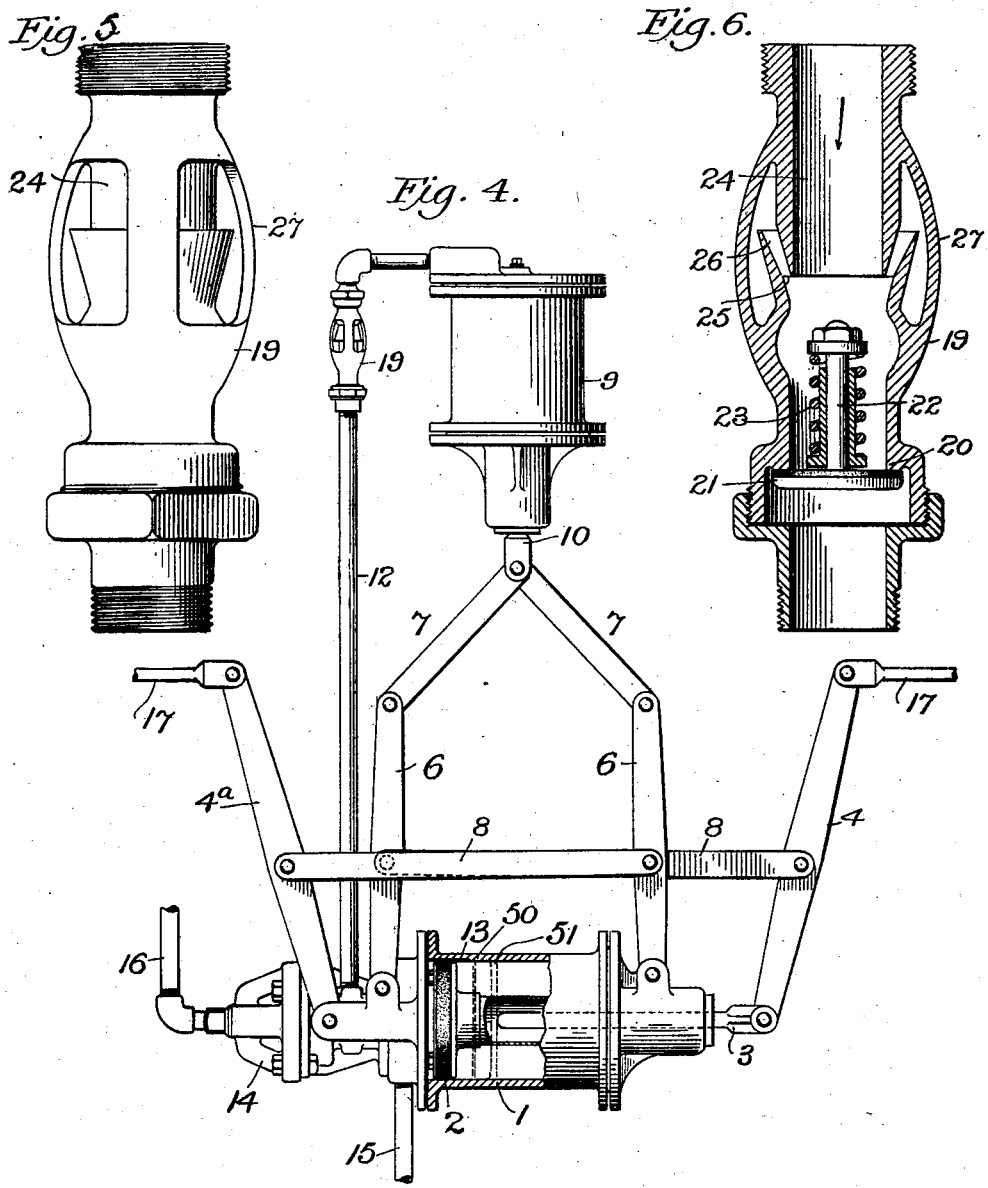
WITNESSES:
James F. Duhamel
M. L. Shay
INVENTOR
Edward G. Shortt,
BY
Fred E. Tasker
ATTORNEY No. 756,065. PATENTED MAR. 29, 1904.
E. G. SHORTT.
COMPOUND AIR BRAKE MECHANISM.
APPLICATION FILED JULY 1, 1902.
NO MODEL. 4 SHEETS—SHEET 4.

WITNESSES:
James F. Duhamel.
M L Shay

INVENTOR
Edward G. Shortt,
BY
Fred L. Tasker
ATTORNEY

THE NORRIS PETERS CO., PHOTO-LITHO., WASHINGTON, D. C.

No. 756,065. Patented March 29, 1904.

UNITED STATES PATENT OFFICE.

EDWARD G. SHORTT, OF CARTHAGE, NEW YORK, ASSIGNOR TO INTERNATIONAL AIR BRAKE COMPANY, OF JERSEY CITY, NEW JERSEY, A CORPORATION OF NEW JERSEY.

COMPOUND AIR-BRAKE MECHANISM.

SPECIFICATION forming part of Letters Patent No. 756,065, dated March 29, 1904.

Application filed July 1, 1902. Serial No. 113,904. (No model.)

*To all whom it may concern:*

Be it known that I, EDWARD G. SHORTT, a citizen of the United States of America, and a resident of Carthage, county of Jefferson, and State of New York, have invented certain new and useful Improvements in Compound Air-Brake Mechanism, of which the following is a specification.

This invention relates to fluid-pressure railway-brakes, and more particularly to means for augmenting, multiplying, or intensifying the braking pressure on the wheels at the time of emergency action and then forthwith automatically relaxing or diminishing the said pressure proportionately to the reduction of speed effected by the application of the high braking pressure in such a manner as to prevent the sliding of the car-wheels, but without impairing the efficiency of brake action.

The principal object of my present improvement is to achieve the most complete and desirable results in the line of perfected brake service by compounding the use of the air to a certain extent after the manner of the compound use of steam in a steam-engine, and more especially in a brake system intended and adapted for use with high speed or heavily-loaded trains.

The invention consists, essentially, in an auxiliary or supplemental cylinder containing a piston, the action of which is combined with a leverage mechanism attached to the brake-rigging, said piston being operated by train-pipe air supplied through the triple valve at the time of emergency action, and the result of the stroke of this piston on the said system of levers being to bring the brake-shoes preliminarily into contact with the wheels, thus not only taking up clearance, looseness, and slack, but also and besides imparting a preliminary braking action to the shoes and preparing them for further immediate braking action with as short a travel as possible of the brake-cylinder piston. Concurrently with the introduction of the train-pipe air into the extra cylinder auxiliary-reservoir air-pressure enters the brake-cylinder and imparts to the piston therein a movement, one that is short and limited, but which is all that is necessary to complete the maximum braking of the wheels, inasmuch as the action of the system of levers expanding under the power brought to bear thereon through the medium of the extra cylinder and its piston has so advanced the shoes against the wheels that only a limited movement of the brake-cylinder piston is essential to finish braking action. This limited movement needs only to be a few inches, or enough to take the piston beyond the end of the leakage-groove in the brake-cylinder. If now the train-pipe pressure in the supplementary cylinder and the impelling reservoir-pressure in the end of the brake-cylinder remain in the same condition, there could be no further movement of the brake-cylinder piston while two pressures are so held; but if the train-pipe pressure is allowed to gradually withdraw from the supplemental cylinder, thus taking the pressure off the system of levers, they will be allowed to relax or restore themselves to their former normal position, and the brake-rigging will of course simultaneously be relaxed, and consequently with this relief of pressure against the shoes the braking pressure in the brake-cylinder acting against the piston will expand and cause said piston to make an additional onward travel in the cylinder toward the opposite end thereof; but such further travel, since it is due to the expansion of the initial volume of cylinder braking pressure, and not due to any increase in said pressure in the brake-cylinder, will not augment the strength or power of the application of the shoes to the wheels, notwithstanding the fact that the piston moves farther in the direction in which it ordinarily moves for increasing braking action, but instead will diminish or weaken the same sufficiently to prevent a locking of the shoes to the wheels; and my invention includes as a part thereof an automatic valve mechanism operated by a vacuum-producing mechanism controlled by the movement of the train and variable with its speed for releasing the train-pipe pressure in the supplementary cylinder, so that when the speed is the highest full braking pressure may be bestowed and retained, but a gradual relaxation of brake-shoe contact will ensue when the slowing down of the train begins to be appreciable in influencing the action of the automatic valve.

The invention consists, furthermore, in various details and peculiarities in the construction, combination, and arrangement of parts, substantially as will be hereinafter more fully described and claimed.

Figure 7:
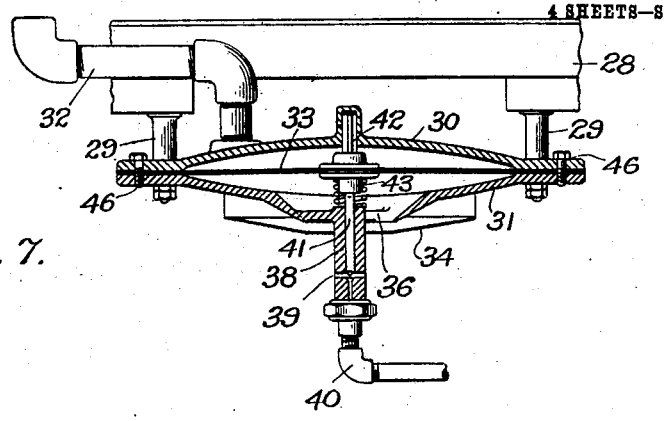
Figure 8:
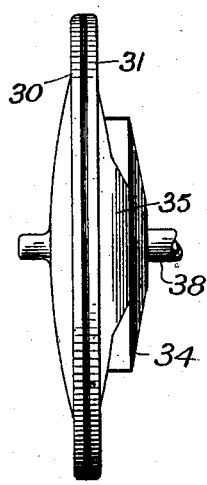
Figure 9:
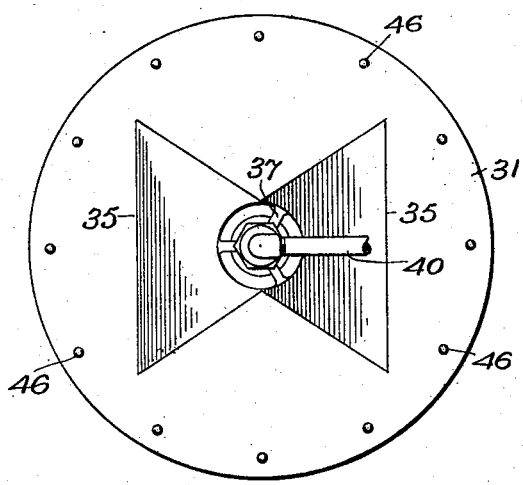

In the accompanying drawings, illustrating my invention, Figure 1 is a side elevation, in partial section, of a triple valve belonging to an air-brake valve mechanism, in connection with which triple valve my present improvements are applied and arranged. Fig. 2 is a cross-sectional view of the same valve mechanism. Fig. 3 is a plan view, in partial section, of the brake-cylinder, triple valve, supplemental cylinder, and leverage mechanism. Fig. 4 is a similar view to Fig. 3, but shows the pipe which conducts train-pipe air from the triple valve to the extra cylinder provided with an automatic valve device. Fig. 5 is a detail outside view of said automatic valve device. Fig. 6 is a longitudinal section of the same. Fig. 7 is a sectional detail view of a diaphragm-provided automatic speed-operated exhaust-valve for the supplemental cylinder. Fig. 8 is an edge view of the same. Fig. 9 is a bottom plan view.

Similar characters of reference designate corresponding parts throughout the different figures of the drawings.

1 denotes the brake-cylinder of a railway fluid-pressure brake mechanism. It is provided with a piston 2, having a piston-rod 3, the latter projecting through the right-hand end or head of cylinder 1. Cylinder 1 is provided on its inner wall with a leakage-groove 13, running for the requisite distance—say a few inches—from the left-hand end of the cylinder, as shown in Figs. 3 and 4. The left-hand head of cylinder 1 is provided with a fixed stud or projection 5, to which a lever belonging to the brake-rigging is pivoted, as will be presently explained.

14 designates a triple valve located in any convenient position—as, for instance, at the left-hand end of the brake-cylinder—said triple-valve device being provided with a train-pipe connection 16 and an auxiliary-reservoir connection 15.

9 indicates an extra, auxiliary, supplemental, or compound cylinder of proper size and capacity and located beneath the car, preferably at a convenient distance from the brake-cylinder 1. The size of compound cylinder 9 relatively to brake-cylinder 1, as also the relative location of the two, must be determined in practice. Compound cylinder 9 contains a piston 11, having a piston-rod 10. In the present example of my invention cylinder 9 lies at right angles to the direction of cylinder 1, and consequently piston-rod 10 travels in a direction at right angles to the direction of travel of brake-cylinder piston-rod 3. (See Figs. 3 and 4.) A train air-pipe 12 leads from the triple valve 14 to the cylinder 9 and has the function of delivering train-pipe air at the time of emergency to said cylinder.

It may be remarked that a triple valve in most common and well-known types of air-brakes serves entirely to deliver both train-pipe air and auxiliary-reservoir air to the brake-cylinder upon the occasion of emergency action. The triple valve 14, however, belonging to my present invention is distinguished from the common type in several respects, and principally in this, that in addition to the opening 61 in the wall thereof, which opening, as shown in Fig. 1, leads from the triple valve to the brake-cylinder, there is an opening 18 in the wall thereof contiguous to some train-pipe space or passage, in which opening is screwed or otherwise attached the end of the train air-conveying pipe 12, this arrangement being with the intention that at the time of emergency action train-air instead of being thus transferred to the brake-cylinder, or exhausted to the atmosphere, or otherwise disposed of shall as to a large portion thereof be carried by means of pipe 12 to cylinder 9, and therein permitted to act against the piston 11 and reciprocate the piston-rod 10, and thus serve as a leverage-actuating pressure, whereby slack is taken up and a preliminary braking action obtained. Triple valve 14 has the emergency-piston 62, and it is provided with an opening or orifice 60, running vertically therethrough at some suitable point. The object of this opening 60 is to permit a release of pressure from the compound cylinder 9 through the common release-port of the triple valve, the direction of such release being indicated by the arrows represented in the broken section of the triple valve in Fig. 1. When the cock 45 at the end of the compound cylinder 9 is closed, as shown in Fig. 3, the release of pressure from the brake-cylinder can take place in the manner I have just indicated. Both cylinders—that is to say, the brake-cylinder and the compound supplemental cylinder—are released by the same operation that would put the brake-cylinder proper in release position. When the brake is operated under these conditions, the full power of both cylinders is given to the loaded car to which the brake is attached, and consequently the invention becomes of the highest importance for use with a heavily-loaded car.

At a suitable point in the length of the pipe 12 I insert a valve casing or shell 19, within which are a seat 20 and a valve 21, having a stem 22 and provided with a closing-spring 23. Valve 21 is opened by the passage of air through pipe 12 on its way to cylinder 9. In such opening the spring 23 is overcome, and the valve will remain open so long as the pressure of air is sufficient to overcome spring 23; but when the pressure falls below the tension of the spring the valve will close, spring 23 will have such a strength or be set to possess such a definite resisting power that it will close the valve 21 when the proper amount of train-pipe air has passed into the cylinder to accomplish the object of its introduction, which is, as I have already intimated, the actuation of a system of levers to be presently described. The passage through the shell or casing 19 from end to end is a continuous bore 24, the diameter of which varies at certain points, but only so much as may be necessary to suit the arrangement of the valve 21. At a certain point in this passage 24, on that side of the valve 21 toward the triple valve, is a lateral opening 25, entering an inclined annular passage 26, that is directed backward or in a direction the reverse of that in which the air-pressure normally travels to the cylinder 9. The outside mouth of this annular passage 26 is protected by the external integral ribs or skeletal construction 27 of shell 19. (See Figs. 4, 5, and 6.) Obviously the passage of an air-current through bore 24 will find no chance of escape through the reversely-inclined passage 26 so long as it has an opportunity to open and pass the valve 21; but should the valve 21 be closed owing to the weakness of the pressure the latter would find exit to the atmosphere through the passage 26 and between ribs 27. It may not be necessary to employ a valve in the air-pipe 12 of the character just described or of any other construction, and I am at liberty, therefore, to dispense with it if thought best and use a plain unvalved pipe like that shown in Fig. 3.

I will now explain the levers arranged between the cylinder 9 and piston-rod 10 and the brake-cylinder. 4 and 4ª denote floating levers, lever 4 being pivoted at one end to the end of brake-cylinder piston-rod 3 and lever 4ª being pivoted at one end to the stationary projection 5 on one end of the brake-cylinder 1. Floating levers 4 and 4ª are pivoted to the brake-rods 17, which extend to the brake-levers that are commonly pivoted to offsets of the brake-beams carrying the shoes. (Not shown.) Expansion-levers 6 6 are pivoted at one end to lugs, offsets, or other stationary parts of brake-cylinder 1 at opposite ends of the latter, while to the other end of these expansion-levers 6 6 are pivoted toggle-links 7 7, which are pivotally connected to the end of the piston-rod 10. At about the middle point of the expansion-levers 6 links 8 are pivoted thereto, which links are likewise pivoted to the floating levers 4 and 4ª at substantially near the middle points of the latter. Obviously the outward movement of the piston-rod 10 will expand or spread the toggle-links 7 and expansion-levers 6 from the position shown in full lines in Fig. 3 to the position shown in dotted lines in the same figure, and the effect of such action will be to throw the floating levers 4 and 4ª, through the intermediate action of the links 8, into the position shown in dotted lines, which will apply the brake-shoes to the wheels with a preliminary braking action, taking up all the slack of the mechanism, as well as the clearance and wear, and so conditioning the parts that the movement of the brake-cylinder piston in completing braking action will be much shorter than otherwise for a given amount of pressure to be exerted on the wheels.

The extra cylinder 9 is provided in the head opposite that through which the piston 10 projects with an escape-pipe 44, having a valve or cock 45 therein, which permits or prevents the escape of the piston-impelling pressure to the atmosphere. When cock 45 is open, the pressure will gradually escape to the atmosphere. When it is closed, the release will occur in another way through the port 60 and the triple-valve release-port, as shown and described. Manifold ways may be devised for permitting and controlling the escape of pressure from cylinder 9. In many instances the simple valve device 45 will be sufficient; but oftentimes a more complicated arrangement is to be preferred if it enables an automatic and variable release of the pressure to take place.

In Figs. 7, 8, and 9 I have illustrated one form of automatic variable valve for this purpose. In the said figures pipe 40 is designed to be coupled to the head of the cylinder 9 in lieu of the escape-pipe 44. 28 indicates the sill or flooring of a car, attached to which are the downwardly-projecting standards or brackets 29, that support a diaphragm-containing chamber, composed of the upper circular plate 30 and the lower circular plate 31, both of which are convex in form, as shown, between which two plates is held the flexible or elastic diaphragm 33, and the two plates 30 and 31 and the edges of the intermediate diaphragm being firmly united together by means of a series of screws or bolts 46.

The compartment within the diaphragm-containing chamber, above the diaphragm and inclosed by it and the top plate 30, is entered by a pipe 32, leading from the interior of the car or some other suitable point and designed to admit atmospheric pressure to the top of the diaphragm. The lower plate 31 is formed with an open center to allow a suction therethrough, said central portion having the openings 36, between which are the ribs 37. Integral with this central portion is a downwardly-extending tube 38, having a central passage containing a pin-valve 41 and having a horizontal passage 39 crossing the central passage at right angles, the lower end of the tube 38 being coupled to the pipe 40. The valve 41 controls the horizontal passage 39 and also the vertical passage that intersects said horizontal passage, and consequently controls the outflowing of air-pressure to the atmosphere from the cylinder 9. Valve 41 is attached to the diaphragm 33, and a spring is tensioned between the center of said diaphragm and the upper end of tube 38, the effect of which spring is to lift the diaphragm, and consequently lift the valve off its seat and open the passage 39. Furthermore, the diaphragm is provided on top at the center with a stem 42, serving as a guide and entering a guide-cap at the center of the top plate 30 for the purpose of keeping the parts in proper relative position and securing steadiness and balance of movement.

Attached to the under side of the plate 31 is a horizontal open-ended frame provided with mouths 35, one of which opens toward one end of the car and the other toward the other end, which mouths contract in size toward the center of the frame, the latter being made of skeleton form at the center. In whichever direction the car may be moving, therefore, a draft or suction will be created through the mouths 35, the effect of which will be to exhaust air from the chamber below the diaphragm 33, creating there a vacuum more or less complete, for the exhaust will vary proportionately to the speed of the train, the vacuum being more and more perfect the faster the train runs, with the result when the train is running very fast of having atmospheric pressure on top of the diaphragm 33 sufficient to keep the valve 41 closed and prevent any outlet of air from the extra cylinder 9, while, on the other hand, when the train begins to slow down and the pressure is taken off the diaphragm to a greater or less extent valve 41 will open and will permit the exit of train-pipe air to the atmosphere from the extra cylinder.

It remains now to describe the operation. When a high braking pressure is needed and in order to obtain it the pressure in the train-pipe is largely reduced by the proper manipulation of the engineer's valve, train-pipe air will be diverted by the triple valve into the supplementary-cylinder supply-duct 12 instead of passing directly into the brake-cylinder as has heretofore been commonly the procedure, and concurrently with the diversion of the train-pipe air into this pipe 12 the auxiliary-reservoir air will be introduced into the brake-cylinder 1 and caused to act against the piston 2. The result of carrying the train-pipe air into the compound cylinder 9 will be to thrust the piston 11 to near the end of that cylinder, and thereby give to the piston-rod 10 a proper stroke which will spread the toggles 7 into the position shown in dotted lines, or thereabout, in Fig. 3, at the same time opening the expansion-levers 6 6, which will draw on the links 8 8 and bring the floating levers 4 4ª nearer to each other, the effect of which will be to impart a preliminary braking action to the brake-shoes, not only seating the latter closely up against the wheels, but forcing them against the wheels with braking action. Since the clearance and slack are taken up and a preliminary braking action afforded by the action of the train-pipe air in the supplementary cylinder, the auxiliary-reservoir air in the brake-cylinder will not cause the piston 2 to travel as far as it might otherwise, but only for a short distance, or far enough to pass beyond the end of the leakage-groove 13—that is to say, to the position indicated in dotted lines at 50. (See Figs. 3 and 4.)

The maximum braking pressure attainable with this construction obviously is very high. So long as the air-pressure in cylinder 9 remains confined there without any avenue of escape the parts will all stay in the identical position they have just assumed; but with such great and extreme pressure against the wheels as this arrangement gives there would be great danger of sliding and skidding of the wheels at moderate speed, and accordingly it becomes necessary to gradually relax the pressure, though without impairing the efficiency of braking action, for inasmuch as the first application of force by the shoes to the wheels will obviously give an immediate check to the speed of the train it will be obvious that if this braking pressure can be gradually reduced in degree concurrently and in the same ratio with the diminution of train speed the braking power will be more effective and yet the disadvantage of sliding the wheels will be obviated. Therefore I provide the compound cylinder 9 either with an escape-port which is governed by a cock 45 or with an automatically-operating variable-escape device. In Fig. 3 escape of pressure takes place through pipe 44 and cock 45 if the latter is open, or through the triple valve if cock 45 is closed. In Fig. 7 the escape takes place through the port 39, controlled by the needle-valve 41, which is automatically opened and closed by the speed of the train acting to create a vacuum below the diaphragm which varies in intensity as the speed of the train varies. As soon as the pressure in cylinder 9 subsides and reduces its effect on the piston 11 the leverage devices will relax their tension and gradually be restored to the position shown in full lines in Fig. 3, and in so doing the brake-cylinder piston 2 will be free to move a further distance in the brake-cylinder; but forasmuch as the volume of impelling pressure on said piston will not be increased, but will remain the same, this further travel of the piston 2 must be the result of the expansive action against said piston. Such expansion will obviously take place and a further movement of the piston will ensue, but such movement will not have the same intensity or strength as before, but be weaker, for the greater volume of expended air will be obviously weaker than the initial volume of air, and accordingly, although the piston will have traveled a longer distance through the cylinder, the braking action of the shoes against the wheels will be less than during its first travel. This second movement of the piston will bring it to a position somewhere near the position indicated in dotted lines at 51 in Figs. 3 and 4. The subsidence of the lever-impelling or take-up pressure, together with its eduction from cylinder 9 and the expansion of brake-cylinder pressure, will consequently, without impairing the efficiency of braking action, largely reduce the power of the same in a ratio proper and necessary to prevent sliding of the wheels.

Having thus described my invention, what I claim as new, and desire to secure by Letters Patent, is—

1. In a fluid-pressure brake mechanism including a brake-cylinder and its piston, automatically-operating means for effecting a maximum braking pressure by a short travel of the piston and a diminution of braking pressure by further travel of the same.

2. In a fluid-pressure brake mechanism including a brake-cylinder and its piston, automatically-operating means independent of the brake-cylinder for effecting a preliminary braking action, and means for effecting a maximum braking pressure by a short travel of the brake-piston and a reduction in braking pressure by a further travel of the same.

3. In a fluid-pressure brake mechanism, the combination with a brake-cylinder and its piston, of a supplementary cylinder and its piston, means for delivering air-pressure to both cylinders, a lever mechanism actuated by the pressure in the supplementary cylinder for effecting a preliminary braking, which pressure is reduced to permit the restoration of the leverage to a normal position in order that the expansion of the initial pressure introduced against the brake-piston may cause a further travel of the same to relieve the braking pressure enough to prevent sliding the wheels.

4. In a fluid-pressure brake mechanism, including a brake-cylinder and its piston, an auxiliary cylinder containing a piston, in combination with a system of levers whereby pressure introduced from the train-pipe into the auxiliary cylinder affords a preliminary braking action which is gradually reduced in proportion to the variation in the speed of the train, and means for introducing train-pipe pressure into the auxiliary cylinder and auxiliary-reservoir pressure into the brake-cylinder in order that the latter pressure may impart an initial movement to the piston and give a maximum braking pressure and when expanded a secondary movement of additional travel to give a reduced braking pressure.

5. In a fluid-pressure brake mechanism including a brake-cylinder and its piston, an auxiliary cylinder having a piston, means for introducing train-pipe pressure into said auxiliary cylinder, means for introducing auxiliary-reservoir pressure into the brake-cylinder, said auxiliary cylinder being for the purpose of effecting a preliminary and temporary braking action concurrently with the initial movement of the brake-cylinder piston under the impulse of reservoir-pressure, which latter pressure expands when the auxiliary-cylinder action ceases and drives the brake-cylinder piston further on in its stroke with reduced force for accomplishing a reduction of braking pressure.

6. In a fluid-pressure brake mechanism, the combination of a brake-cylinder and its piston, an auxiliary cylinder and its piston, a triple valve, a connection between the triple valve and the auxiliary cylinder for delivering train-pipe air to the latter, suitable means for delivering auxiliary-reservoir air to the brake-cylinder, and a leverage actuated by the pressure in the auxiliary cylinder to take up the slack of the brake-rigging and make a preliminary application of the shoes, means for terminating this action on said levers, in order that the volume of pressure in the brake-cylinder which causes an initial movement of extreme braking action to the piston may impart thereto a secondary movement of diminished brake action.

7. In a fluid-pressure brake mechanism, the combination with a brake-cylinder, auxiliary reservoir, train-pipe and triple valve, of a supplemental cylinder and its piston, means for delivering train-pipe pressure to the supplemental cylinder and reservoir-pressure to the brake-cylinder, leverage mechanism actuated by the pressure in the supplementary cylinder for taking up slack and effecting a preliminary braking, means for releasing said pressure to permit restoration of the leverage to its normal position, all the parts being combined and operating so that a maximum braking pressure may be effected by a short travel of the brake-piston and a diminution of braking pressure by a further travel of the same incident upon the expansion of the initial pressure against the brake-piston.

8. In a fluid-pressure brake mechanism, the combination with the essential elements of a brake system, of a supplementary cylinder and its piston, means for delivering train-pipe pressure to said cylinder consisting of a pipe leading from the triple valve to the cylinder, a leverage mechanism actuated by the pressure in the supplementary cylinder for taking up slack and effecting a preliminary braking, means for releasing said pressure to permit the restoration of the leverage to its normal position, all the parts being combined and operating so that a maximum braking pressure may be effected by a short travel of the brake-piston and a diminution of braking pressure by a further travel of the same incident upon the expansion of the initial pressure against the brake-piston.

9. In a fluid-pressure brake mechanism, the combination with the essential elements of a brake system, of a supplementary cylinder and its piston, means for delivering train-pipe pressure to the supplementary cylinder, consisting of a pipe leading from the triple valve to said cylinder, a valve device in said pipe that permits air to pass to the cylinder and prevents it from returning, means arranged in connection with said valve device to allow escape to atmosphere of any surplus of air, leverage mechanism actuated by the pressure in the supplementary cylinder for taking up slack and effecting a preliminary braking, means for releasing said pressure to permit the restoration of the leverage to its normal position, all the parts being combined and operating so that a maximum braking pressure may be effected by a short travel of the brake-piston and a diminution of braking pressure by a further travel of the same incident upon the expansion of the initial pressure against the brake-piston.

10. In a fluid-pressure brake mechanism, the combination with the essential elements of a brake system, of a supplementary cylinder and its piston, a valve-provided pipe leading from the triple valve to the supplementary cylinder for carrying train-pipe air to said cylinder, a leverage mechanism actuated by pressure in the supplementary cylinder for effecting a preliminary braking, means for allowing the release of this pressure from the supplemental cylinder, all the parts being arranged and operating so that the maximum braking pressure may be effected by a short travel of the brake-piston and a large diminution of braking pressure by further travel of the same to prevent sliding of the wheels.

11. In a fluid-pressure brake mechanism, the combination with the essential elements of a brake system including a brake-cylinder and its piston, of a supplementary cylinder and its piston, means for delivering air-pressure to both the supplementary and the brake cylinders, a leverage mechanism actuated by the pressure in the supplementary cylinder for effecting a preliminary braking, means for reducing said pressure to permit the restoration of the leverage to a normal position, said means consisting of a diaphragm-operated valve, and vacuum-producing means operated by the movement of the train to control the action of said valve automatically, all the parts being combined and operating so that the expansion of the initial pressure introduced against the brake position may cause a further travel of the same to relieve the braking pressure and to prevent sliding of the wheels.

12. In a fluid-pressure brake mechanism including a brake-piston and its cylinder, automatically-operating means independent of the brake-cylinder for effecting a preliminary braking action, said means consisting essentially of an independent cylinder and its piston, and means for effecting a maximum braking pressure by a short travel of the brake-piston and a reduction in braking pressure by a further travel of the same.

Signed at Carthage, New York, this 19th day of June, 1902.

EDWARD G. SHORTT.

Witnesses:
   ALLEN E. KILBY,
   CHARLES E. NORRIS.